Figures 1, 2, 3:
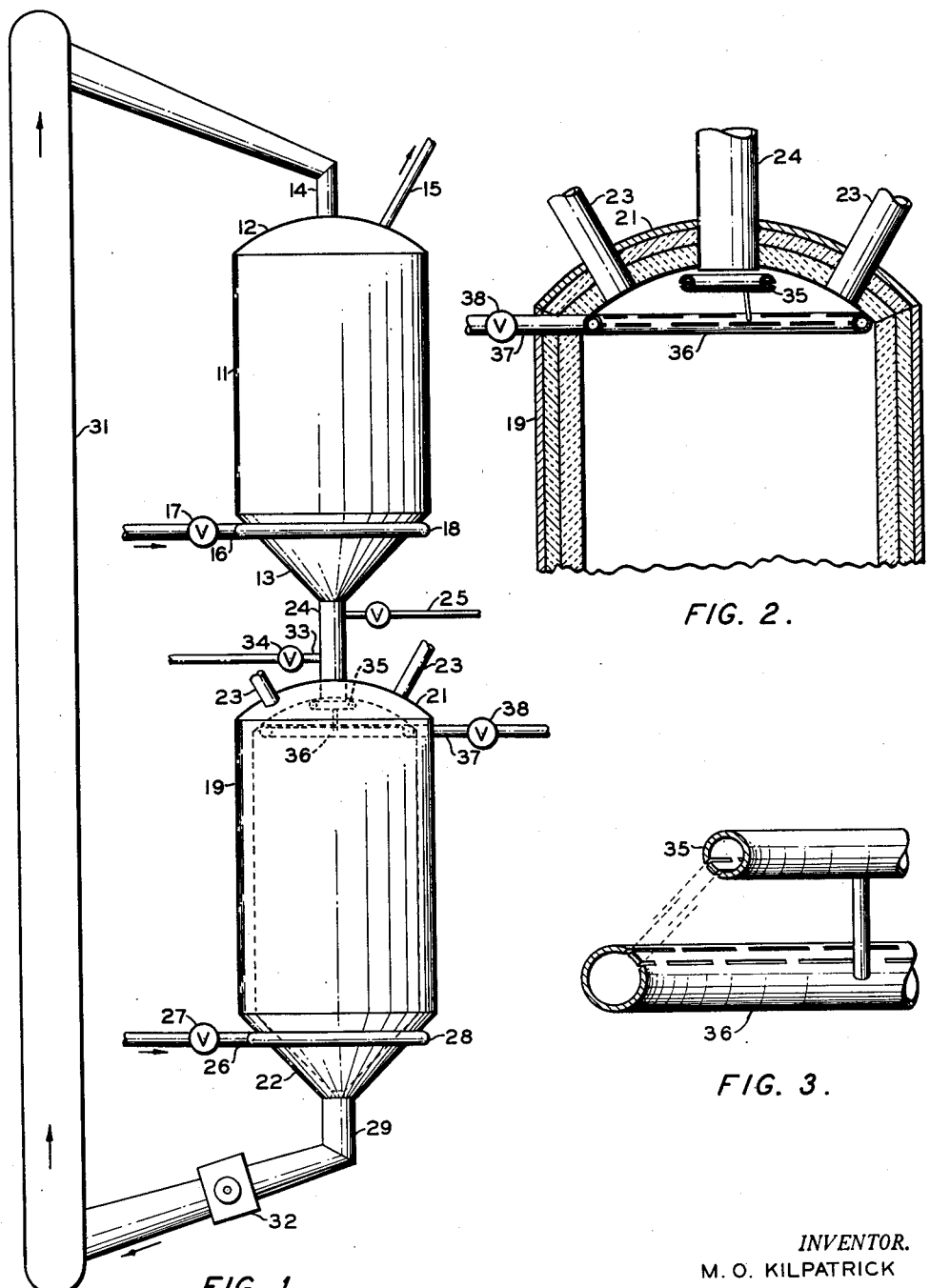

June 8, 1954

M. O. KILPATRICK 2,680,706

DEVICE AND METHOD FOR PREVENTING CARBON
LAYDOWN DURING HYDROCARBON CONVERSION

Filed Sept. 18, 1950

INVENTOR.
M. O. KILPATRICK

BY Hudson and Young

ATTORNEYS

Patented June 8, 1954

2,680,706

UNITED STATES PATENT OFFICE 2,680,706

DEVICE AND METHOD FOR PREVENTING CARBON LAYDOWN DURING HYDROCARBON CONVERSION

Myron O. Kilpatrick, Bartlesville, Okla., assignor to Phillips Petroleum Company, a corporation of Delaware Application September 18, 1950, Serial No. 185,437

7 Claims. (Cl. 196—55)

This invention relates to the conversion of hydrocarbons. In one of its more specific aspects, it relates to the conversion of hydrocarbons in pebble heater apparatus. In another of its more specific aspects, it relates to improved pebble heater apparatus for the conversion of hydrocarbons. In another of its more specific aspects it relates to a means and method for preventing carbon deposits in the upper portion of a reactor chamber of pebble heater apparatus.

Conversion of hydrocarbons in pebble heater apparatus has within the last few years proved to be comparable very efficient and considerable use of such apparatus in the conversion of such materials has been made. One of the outstanding difficulties which has been encountered during the operation of pebble heater apparatus in the conversion of hydrocarbons is laydown of carbon around the gaseous effluent conduit from the upper portion of the reactor chamber of the pebble heater device. Such carbon laydown results in problems such as an undue increase in pressure drop through the reactor chamber. An even more serious problem is encountered by reason of the fact that large aggregates of the coke or carbon break loose from the surface of the reactor chamber and gravitate through the chamber and eventually lodge in the pebble outlet from the reactor chamber or in the elevator system for the pebble heater device. When the coke lodges in the pebble outlet conduit or in the elevator, flow of pebbles through the pebble heater system is considerably reduced and is finally brought to a standstill and it is necessary to take the pebble heater system off stream to remove the coke material from the chamber.

Heavy residual oils particularly have long posed a considerable problem in the petroleum industry. Although refining techniques of the petroleum industry have improved greatly during the past several years, heavy residual oils have been of little or no value because of the very great tendency for such materials to form and deposit coke, tar, or other carbonaceous material in refining equipment. As the demand for petroleum products has increased, that demand has placed a greater burden upon the natural resources of the world and has focused attention more directly on what heretofore has been deemed waste materials. Heavy residual oils are very closely akin to waste materials and it is believed therefore that any process which aids in the utilization of such materials is of very great importance.

It has recently been determined that pebble heater apparatus may be successfully used in the conversion of such heavy residual oils to form desirable lower boiling materials such as aromatic gasoline fractions, olefins, hydrogen and normally gaseous hydrocarbons. Conversion of heavy residual oils in pebble heater apparatus, however, accentuates the problem of carbon laydown in the reactor chamber. The problem of carbon laydown in the reactor chamber of pebble heater apparatus is, however, very acute even when converting normally gaseous hydrocarbon materials to other gaseous hydrocarbon materials.

I have devised a method whereby the problem of carbon laydown on the reactor chamber is substantially overcome. It is believed that carbon is deposited on the surface of the reactor chamber in areas not abraded by the gravitating flow of particulate solid heat exchange material by reason of the fact that a portion of the reaction products resulting from the conversion of hydrocarbons in the reactor chamber are not immediately removed from the reactor chamber and are allowed to contact the surface of that chamber at points which are not abraded by the pebbles. The surface of the reactor chamber is at a high temperature and causes the reaction products to be further converted and carbon is formed thereby. The carbon which is formed is deposited upon the inner surface of the top of the reactor chamber. The carbon laydown during operation of the pebble heater apparatus often becomes several inches thick and sometimes completely closes off the gaseous effluent conduit from the reactor chamber. I have found that by blanketing with steam substantially all of the inner surface of the top of the reactor chamber which is not subjected to the abrading action of the gravitating flow of particulate solid heat exchange material, products resulting from the conversion of hydrocarbons within the reactor chamber are substantially prevented from contacting the inner surface of the reactor chamber at such points. The reaction products, therefore, are removed from the reaction chamber before they have time to contact that portion of the reactor chamber which would cause laydown of carbon by further conversion thereof.

An object of this invention is to provide an improved pebble heater apparatus. Another object of the invention is to provide an improved method for preventing carbon laydown in the upper portion of the pebble heater apparatus. Another object of the invention is to provide means for providing a blnaket of inert gas for the inner surface of the upper portion of the reactor chamber of pebble heater apparatus, which inert gas has a relatively high velocity as compared to the flow of reaction products. Other and further objects and advantages will be apparent to those skilled in the art upon study of the accompanying disclosure and the drawings.

Solid heat exchange material which may be utilized in the pebble heater system of this invention is generally termed "pebbles." The term "pebbles" as used herein denotes any substantially solid material of flowable size and form which has sufficient strength to withstand mechanical pressures and the temperatures encountered within the pebble heater system. These pebbles must be of such structure that they can carry large amounts of heat from one chamber to another without rapid deterioration or substantial breakage. Pebbles which may be satisfactorily used in this conversion system may be substantially spherical in shape and range from about one-eighth inch to about one inch in diameter. The pebbles are preferably of a size within the range of from one-eighth inch to five-eighths inch in diameter. Materials which may be used singly or in combination in the formation of such pebbles include among others alumina, silicon carbide, periclase, beryllia, mullite, nickel, cobalt, copper, iron, magnesia, and silica.

More complete understanding of the invention will be obtained upon reference to the diagrammatic drawings in which Figure 1 is a schematic elevation of pebble heater apparatus of this invention. Figure 2 is a broken sectional view of the upper portion of a reactor chamber showing means by which a steam blanket is provided in the upper portion of such a chamber. Figure 3 is a schematic section view of a portion of the header members used in blanketing the upper portion of a reactor chamber of this invention with an inert gas such as steam.

Referring particularly to Figure 1 of the drawings, pebble heater chamber 11 is an upright elongated chamber closed at its upper and lower ends by closure members 12 and 13, respectively. Pebble inlet conduit 14 is provided in closure member 12 and is preferably centrally positioned therein. Gaseous effluent conduit 15 is provided in the upper end portion of heater chamber 11, preferably in closure member 12. Inlet conduit 16, having flow control valve 17 provided therein, preferably extends at least a portion of the way around the lower end portion of chamber 11 as header member 18 and communicates with the interior of chamber 11 through the lower wall thereof.

Reactor chamber 19, which is also an upright elongated chamber, is provided below heater chamber 11 and is closed at its upper and lower ends by closure members 21 and 22, respectively. Gaseous effluent conduits 23 are provided in the upper end portion of chamber 19, preferably in closure member 21. Pebble conduit 24 extends between the bottom of pebble chamber 11 and the top of pebble chamber 19. Inlet conduit 25 extends into pebble conduit 24 for the purpose of introducing an inert gas, such as steam, or any other non-deleterious gas into conduit 24 so as to prevent the flow of gaseous materials through conduit 24 between chambers 11 and 19. Inlet conduit 26, having flow control valves 27 provided therein, preferably extends at least a portion of the way around the lower end portion of reactor chamber 19 as header member 28. Pebble outlet conduit 29 extends from the lower end of reactor chamber 19 and is connected at its lower end to the lower end portion of elevator 31. The upper end portion of elevator 31 is connected to the upper end portion of pebble inlet conduit 14. Pebble feeder 32 may be any conventional pebble feeder, such as a star valve, a gate valve, a vibratory feeder, or a rotary table feeder. A reactant material inlet conduit 33, having flow control valve, extends into pebble throat 24 preferably at a point below inlet conduit 25. Header members 35 and 36 are provided in the upper end portion of reactor chamber 19 and are connected to inlet conduit 37 having flow control valve 38 provided therein.

Understanding of header members 35 and 36 will be facilitated upon reference to Figure 2 of the drawings. Header member 35 closely encircles the outlet end of pebble conduit 24 at a point adjacent the inner surface of closure member 21 of reactor chamber 19. Header member 36 is positioned at a level below header member 35 and adjacent the outer wall of chamber 19 but slightly above the point at which pebbles normally contact the wall of that chamber upon introduction into that chamber through pebble conduit 24. The pebble will normally assume the form of a cone extending downwardly and outwardly from conduit 24 at an angle from the horizontal of about 30°. Header member 36 is provided with long narrow slots which substantially parallel the surface of reactor chamber 19 and are in that portion of header member 36 which is closest to header member 35. The slots of header member 36 therefore are in the upper and inner portion of that header. Header member 35 is also provided with long thin slots which also substantially parallel the surface of reactor chamber 19 and are provided in that portion of header 35 which is closest to header member 36. The slots in header member 35 therefore are in the lower outer portion thereof. The slots in header members 35 and 36 are preferably positioned so as to be directed toward the slots in the other header.

Slots which are provided in header members 35 and 36 are within a range of between $\frac{1}{64}$ and $\frac{1}{4}$ inch in width, preferably within the range of between $\frac{1}{32}$ and $\frac{1}{8}$ inch. Those slots are spaced apart a distance of $\frac{1}{4}$ inch to 1 inch so as to serially extend about the entire length of the header members and are at least 1 inch in length. Slots which are shorter than 1 inch tend to give a jet action to the inert gas and cause turbulence. Reactor chambers of pebble heater apparatus are subjected to high temperatures, sometimes in the neighborhood of 2200° F. to 2400° F. In order to offset the problem of warping of these header members, it is often necessary to form these headers in a plurality of adjacent serially disposed sections so as to form a substantially continuous ring in the upper portion of the reactor chamber. Expansion and construction of the header is encountered only in the relatively short individual sections. Each of the header sections is therefore provided with a conduit through which inert gas, such as steam, is provided thereto.

In order to provide a heavy blanket of steam adjacent the inner surface of the top of the reactor chamber of the pebble heater apparatus, it is necessary to provide sufficiently long openings in the header members to provide for egress of steam with substantially no turbulence. A plurality of rows of outlet slots are provided in the header members as shown in the section of header member 36 shown in Figure 3. The slots in one row are provided so as to overlap closed portions between slots in another row of the header member. In this manner a complete blanket of steam is provided by ejecting the steam through both rows of slots, which steam flows at a relatively high velocity as compared to the flow of reaction products. Some headers are advantageously provided with slots which individually extend the entire length of each header section.

In the operation of this invention, pebbles are introduced into the upper portion of heater chamber 11 and are gravitated therethrough as a fluent contiguous pebble mass. A heating material is introduced into the lower portion of chamber 11 through inlet conduit 16 and header member 18. The heating material may be a fuel and air, the fuel being burned upon the surface of the pebbles within chamber 11 or below or around the pebble bed. The heating material may also be hot combustion gas resulting from combustion of a fuel outside of the heater chamber. Hot combustion gas provided from a point exterior of heater chamber 11 or that provided by burning fuel within chamber 11 is passed upwardly through the gravitating mass of pebbles within chamber 11 and is removed from chamber 11 through gaseous effluent conduit 15. The gravitating pebbles are normally heated by direct heat exchange with the hot combustion gas to a temperature within the range of between 1200° F. and 2800° F., depending upon the reaction products desired from the conversion within reactor chamber 19. Temperatures within the range of between 1000° F. and 1600° F. are normally used for the conversion of hydrocarbon oils to form olefins and aromatic hydrocarbon fractions, such as gasoline and the like. Temperatures within the range of between 1800° F. and 2600° F. are utilized for converting normally gaseous materials, such as ethane, to ethylene or to acetylene. The temperature to which pebbles are heated within pebble heating chamber 11 are normally about 200° F. above the reaction temperature desired in reactor chamber 19. The hot pebbles are gravitated through conduit 24 into the upper portion of reactor chamber 19 and gravitate through that chamber as a contiguous fluent mass therein.

When hydrocarbon oils, such as residual oils and lighter materials, are utilized as the reactant materials in reactor 19, those reactant materials are introduced into the pebble heater system through inlet conduit 33 which may extend directly into the upper portion of chamber 19 and are distributed over the surfaces of the hot pebbles within pebble conduit 24 and gravitate downwardly into reactor chamber 19 with the gravitating pebbles. The oil is elevated to reaction temperature by the direct heat exchange with the pebbles, and reaction products which are in vaporous or gaseous state are removed from reactor chamber 19 through gaseous effluent conduits 23. An inert gas, such as steam, is introduced into the upper portion of reactor chamber 19 through inlet conduit 37 and header members 36 and 35. The inert gas in the inlet conduit and header members is maintained at a pressure within the range of between 10 and 70 pounds per square inch, preferably within the range of 20 and 60 pounds per square inch. The flow of the inert gas from the header members is such as to form a relatively high velocity blanket of that gas adjacent the surface of the top of the reactor chamber. By "relatively high velocity" I mean that the velocity of the inert gas is greater than that of the reaction products in the upper portion of the reactor chamber. I preferably maintain the velocity of inert gas to reaction products in the ratio of between 1.5:1 to 10:1. The specific design of header members 35 and 36 with their elongated narrow slots makes possible the complete blanketing of the upper portion of the reactor chamber with a relatively high velocity blanket of inert gas. This structure has a very distinct advantage over a device which utilizes a plurality of smaller holes spaced apart around a similar header for the reason that inert gas flowing from holes having a relatively small length and width is in a turbulent state by reason of a jet action and causes the entrainment of a sufficient amount of reaction products and subsequent contact thereof with the hot surface of the top portion of the reactor chamber to cause a substantial amount of carbon laydown thereon. Hydrocarbon gases also flow between the individual separate inert gas streams from such a device and thus avoid the blanketing gas.

Pebbles which are cooled in the conversion of hydrocarbons within reactor chamber 19 are removed through pebble outlet conduit 29 and are fed by means of pebble feeder 32 to the lower portion of elevator 31 by which they are then elevated to pebble inlet conduit 14 and are gravitated into the upper portion of pebble heater chamber 11. The pebbles are then reheated and once again gravitated into the upper portion of reactor chamber 19.

When normally gaseous hydrocarbon materials are utilized as the reactant materials, those reactants are introduced into the lower portion of reactor chamber 19 through inlet conduit 26 and header member 28. The gaseous reactant materials are caused to pass countercurrent to the gravitating flow of pebbles through the reactor chamber and are raised to conversion temperature by direct heat exchange with the hot pebbles in that chamber. Reaction products resulting from the reaction in that chamber are removed from the chamber through gaseous effluent conduits 23 as described above. A blanket of inert gas is maintained in the upper portion of chamber 19 in the same manner as described above.

Steam has been found to be a very effective blanket for preventing the contact of reaction products with the top portion of reactor chamber 19. Hot combustion gas may be utilized for blanketing the inner surface of chamber 19 as long as no excess of oxygen is present therein. Use of the hot combustion gas has the advantage of providing the blanketing effect within the upper portion of chamber 19 without subjecting the pebbles to thermal shock in that chamber. Steam, on the other hand, can be heated to such a temperature that it too will provide the desired blanket effect without subjecting the pebbles to undue thermal shock. Methane or hydrogen are also suitable for use as the blanketing gas in many processes.

Many modifications of this invention will be apparent to those skilled in the art upon study of the accompanying disclosure and the drawings. It is believed that such modifications can be made without departing from the spirit or the scope of this invention.

I claim:

1. A reactor chamber for pebble heater apparatus which comprises in combination an upright elongated closed shell; a pebble conduit centrally positioned in the upper end of said shell; at least one gaseous effluent conduit in the upper end portion of said shell; a pebble outlet conduit in the bottom end of said shell; a reactant material inlet conduit extending into said shell; a first inlet header member inside said shell closely encircling the outlet end of said pebble inlet conduit and adjacent the upper end of said shell, said first header having at least one serially extending plurality of long slots between 1/64 inch and 1/4 inch in width extending around said header at its lower and outer portion and said slots of each said series being spaced apart between 1/4 inch and 1 inch and being at least one inch in length; a second inlet header member extending about the inner periphery of said shell at a level below said first inlet header but adjacent the top of said shell and above the layer of pebbles therein, said second header having at least one serially extending plurality of long slots between 1/64 inch and 1/4 inch in width extending around said header at its upper and inner portion and said slots of each said series being spaced apart between 1/4 inch and 1 inch and being at least one inch in length; and at least one gaseous material inlet conduit extending into said shell and connected to said inlet header members.

2. The reactor chamber of claim 1, wherein at least two series of slots extend longitudinally around each said inlet header and slots of one said series in each inlet header overlap two slots in an adjoining series of slots in the same header.

3. The reactor chamber of claim 2, wherein said series of slots in each said inlet header is between 1/32 inch and 1/8 inch in width.

4. A process for the conversion of hydrocarbons which comprises heating pebbles in a first chamber to a temperature within the range of between 1200° F. and 2300° F.; gravitating said hot pebbles into and through a second chamber; contacting said hot pebbles and hydrocarbon reactant materials in direct heat exchange in said second chamber; raising said hydrocarbon reactant materials to conversion temperature by said direct heat exchange; removing resulting conversion products from the upper portion of said second chamber; blanketing the upper section of said second chamber with a blanket of an inert gas introduced as a thin annular blanket without substantial turbulence from sources at the interior and at the exterior of said annular blanket, said inert gas sources being maintained at a pressure within the range of between 10 and 70 p. s. i. and at a relatively high velocity as compared to said conversion products, so as to separate said conversion products from the inner surface of the upper portion of said second chamber by said relatively high velocity blanket of said inert gas; removing said inert gas from the upper portion of said second chamber with said conversion products; removing said pebbles from the lower portion of said second chamber; and returning said pebbles to said first chamber.

5. The process of claim 4, wherein said inert gas is introduced from sources maintained at a pressure within the range of between 20 and 60 p. s. i.

6. The process of claim 5, wherein said inert gas is steam and is introduced as a plurality of overlapping, low velocity, wide, thin streams.

7. The process of claim 4, wherein the velocity ratio of said inert gas to said conversion products is in the range of 1.5:1 to 10:1.

References Cited in the file of this patent

UNITED STATES PATENTS

| Number | Name | Date |
|---|---|---|
| 2,227,634 | Dalin | Jan. 7, 1941 |
| 2,379,734 | Martin | July 3, 1945 |
| 2,389,493 | Evans | Nov. 20, 1945 |
| 2,412,983 | Hene | Dec. 24, 1946 |
| 2,500,870 | Robinson | Mar. 14, 1950 |
| 2,546,625 | Bergstrom | Mar. 27, 1951 |